United States Patent [19]

Käser et al.

[11] Patent Number: 5,545,725
[45] Date of Patent: Aug. 13, 1996

[54] DISAZO DYES CONSISTING OF TWO MONOAZO DYES CONTANING A 1-PHENYL-5-AMINO PYRAZOLE COUPLING COMPONENT AND CONNECTED BY A BRIDGE MEMBER

[75] Inventors: Adolf Käser, Bottmingen; Willy Stingelin, Reinach, both of Switzerland

[73] Assignee: Ciba-Geigy Corporation, Tarrytown, N.Y.

[21] Appl. No.: 337,919

[22] Filed: Nov. 10, 1994

Related U.S. Application Data

[63] Continuation-in-part of Ser. No. 125,387, Sep. 22, 1993, abandoned.

[30] Foreign Application Priority Data

Sep. 29, 1992 [CH] Switzerland .............................. 3032/92

[51] Int. Cl.⁶ ...................... C09B 35/03; C09B 35/039; C09B 56/04
[52] U.S. Cl. .................... 534/759; 8/549; 8/662; 8/673; 8/681; 8/684; 8/687; 162/162; 534/637; 534/756; 534/760
[58] Field of Search ...................... 534/759, 756, 534/760, 637; 162/162; 8/549, 662, 673, 681, 684, 687

[56] References Cited

U.S. PATENT DOCUMENTS

| 2,241,796 | 5/1941 | Taube et al. | 534/759 X |
| 2,862,919 | 12/1958 | Exner | 534/759 X |
| 3,124,566 | 3/1964 | Jung | 534/759 X |
| 3,210,190 | 10/1965 | Anderau et al. | 534/759 X |
| 4,089,851 | 5/1978 | Kramb | 534/759 X |

FOREIGN PATENT DOCUMENTS

| 0617961 | 4/1962 | Belgium | 534/759 |
| 0759177 | 4/1971 | Belgium | 534/759 |
| 0705780 | 4/1941 | Germany | 534/751 |
| 0647795 | 2/1985 | Switzerland | 534/759 |
| 2076421 | 12/1981 | United Kingdom | 534/759 |

OTHER PUBLICATIONS

Chemical Abstract, 46: 7690(a) (1963) Imperial II.
Chemical Abstract, 25: 2153 (5) (1942) Taube et al III.
Abstract of the Belgium patent No. 0759,177 (1971).
Chemical Abstract, 68: 79643(x) (1968) Jung et al II.

*Primary Examiner*—Floyd D. Higel
*Attorney, Agent, or Firm*—Kevin T. Mansfield

[57] ABSTRACT

Disazo dyes are disclosed which are particularly suitable for dyeing paper.

Paper is dyed with these dyes in greenish-yellow or yellow to red shades of good fastness properties.

22 Claims, No Drawings

DISAZO DYES CONSISTING OF TWO MONOAZO DYES CONTANING A 1-PHENYL-5-AMINO PYRAZOLE COUPLING COMPONENT AND CONNECTED BY A BRIDGE MEMBER

This application is a continuation-in-part of application Ser. No. 08/125,387, filed Sep. 22, 1993, abandoned.

The present invention relates to disazo dyes which contain 1-phenyl-5-aminopyrazoles as coupling component, to the preparation of these dyes and to the use thereof for dyeing paper.

The dyes of this invention have the formula

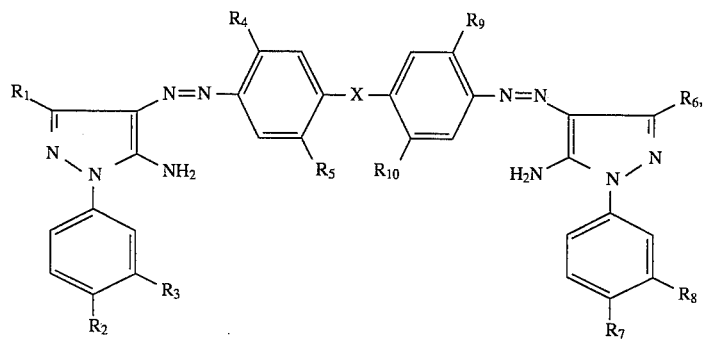
(1)

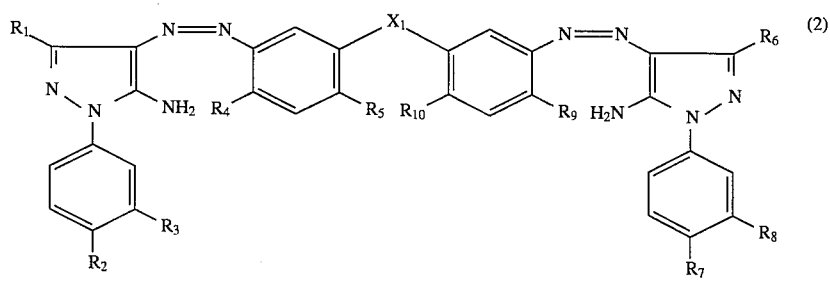
(2)

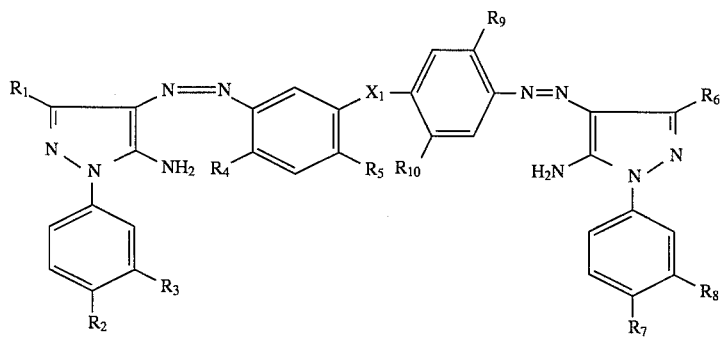
(3)

wherein $R_1$ and $R_6$ are each independently of the other hydrogen, alkyl, alkenyl, acylamino, carbamoyl, carboxy or alkoxycarbonyl, $R_2$, $R_3$, $R_7$ and $R_8$ are each independently of one another hydrogen, halogen, alkyl, sulfo or carboxy, $R_4$, $R_5$, $R_9$ and $R_{10}$ are each independently of one another hydrogen, halogen, alkyl, hydroxy, alkoxy, sulfo or carboxyalkoxy, X is a linking group of formula

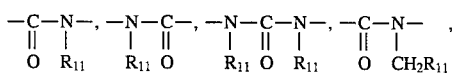

-continued

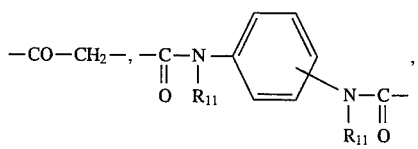

-continued

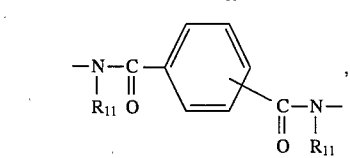

-continued

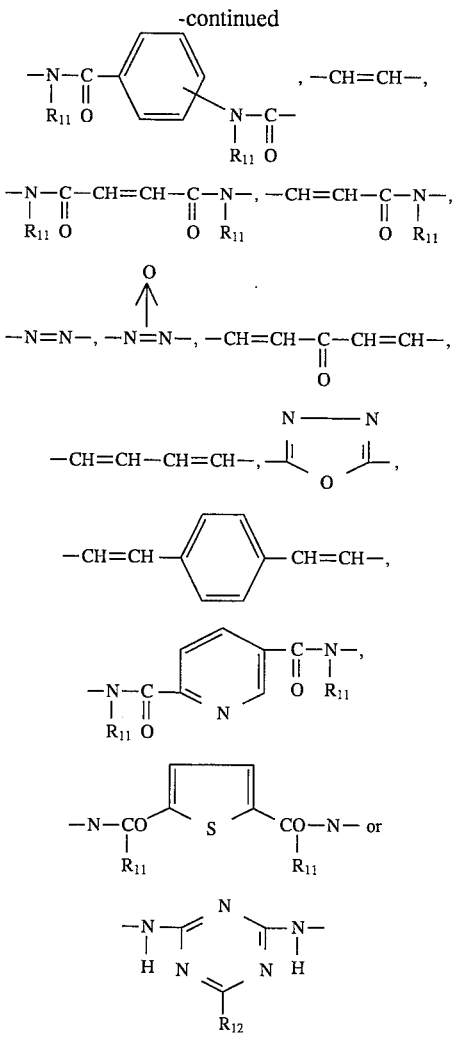

wherein $R_{11}$ is hydrogen or unsubstituted or substituted $C_1$–$C_6$alkyl, and $R_{12}$ is chloro, hydroxy, —$NH_2$ or

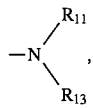

wherein $R_{11}$ is as defined above, and $R_{13}$ is hydrogen, unsubstituted or substituted $C_1$–$C_6$alkyl or unsubstituted or substituted phenyl, or wherein $R_{11}$ and $R_{13}$, together with the linking nitrogen atom, form a 5- or 6-membered ring, and $X_1$ has one of the meanings given for X or is a direct bond, with the proviso that the dyes of the formula (1) contain at least three sulfo groups if X is a linking group of formula

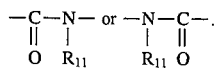

In this invention, alkyl radicals will be generally taken to mean straight-chain, branched or cyclic alkyl groups. Cycloalkyl has preferably 5 to 8 carbon atoms, and open-chain alkyl has preferably 1 to 8 carbon atoms.

Unbranched or branched open-chain alkyl may typically be methyl, ethyl, n- and isopropyl, n-, sec- or tert-butyl, n- and isopentyl, n- and isohexyl or 2-ethylhexyl.

These alkyl radicals may carry one or more substituents, typically including hydroxy, sulfo, carboxy, $C_1$–$C_4$alkoxy, hydroxy-substituted $C_1$–$C_4$alkoxy, phenyl, phenoxy or phenylaminocarbonyl, the phenyl group in which three last-mentioned radicals may be substituted e.g. by $C_1$–$C_4$alkyl, $C_1$–$C_4$alkoxy or phenoxy. Suitable radicals of this type are typically: hydroxyethyl, 1-hydroxyisopropyl, ethoxymethyl, 2-hydroxyethoxypentyl, benzyl, 1-phenylethyl, 2-phenylethyl, 1-methyl-2-phenylethyl, 1-isobutyl-3-phenylpropyl, 1,5-diphenylpent-3-yl, 1-methyl-2-phenoxyethyl or 1-methyl-2-phenylaminocarbonylethyl.

Cycloalkyl is preferably cyclopentyl and cyclohexyl. A suitable substituent is in particular $C_1$–$C_4$alkyl, more particularly $CH_3$.

Suitable alkoxy radicals are preferably those containing 1 to 4 carbon atoms, typically methoxy, ethoxy, propoxy, isopropoxy, n-butoxy, isobutoxy or tert-butoxy.

Halogen will be taken to mean fluoro, bromo, iodo or, preferably, chloro.

Alkenyl radicals are suitably those that are derived from the above mentioned alkyl radicals by replacement of at least one single bond with a double bond. Suitable radicals are e.g. ethenyl or propenyl.

$R_1$ and $R_6$ as an acylamino group may be a group of formula

wherein U is —CO— or —$SO_2$— and Y is unsubstituted or substituted alkyl or phenyl.

Throughout this specification, phenyl radicals will be generally be taken to mean unsubstituted or substituted phenyl radicals. Suitable substituents include $C_1$–$C_4$alkyl, $C_1$–$C_4$alkoxy, bromo, chloro, nitro, sulfo, carboxy or $C_1$–$C_4$alkylcarbonylamino.

$R_1$ and $R_6$ are preferably each independently of the other hydrogen or alkyl, and are preferably each $C_1$–$C_4$alkyl.

$R_4$, $R_5$, $R_9$ and R10 are preferably each independently of one another hydrogen, $C_1$–$C_4$alkyl, $C_1$–$C_4$alkoxy or sulfo, the most preferred meanings being hydrogen, $C_1$–$C_2$alkyl, $C_1$–$C_2$alkoxy or sulfo. The use of dyes of formula (1), wherein $R_4$, $R_5$, $R_9$ and $R_{10}$ each hydrogen or sulfo, is very particularly preferred.

The preferred meanings of $R_2$, $R_3$, $R_7$ and $R_8$ are each independently of one another hydrogen, chloro, methyl or sulfo, most preferably hydrogen or sulfo.

In the dyes of formula (1), X is preferably a linking group of formula

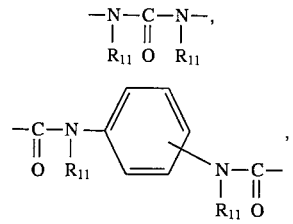

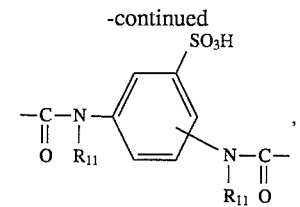

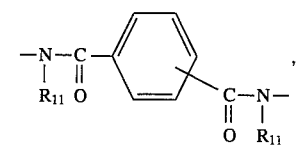

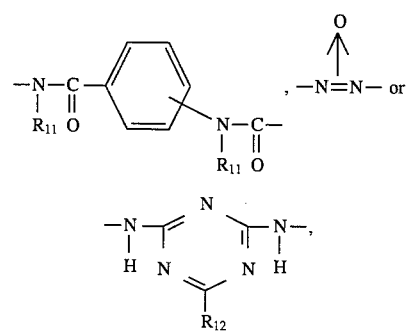, —N=N— or

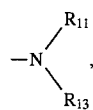

wherein $R_{11}$ is hydrogen or $C_1$–$C_4$alkyl and $R_{12}$ is chloro, hydroxy, —$NH_2$ or

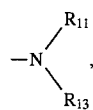

in which $R_{11}$ is as defined above, and $R_{13}$ is hydrogen, unsubstituted or substituted $C_1$–$C_4$alkyl or unsubstituted or substituted phenyl.

Among these dyes, those dyes of formula (1) are especially preferred in which X is a linking group of formula

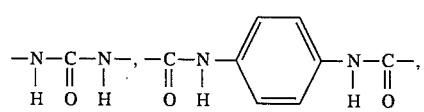

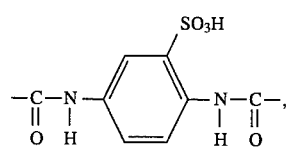

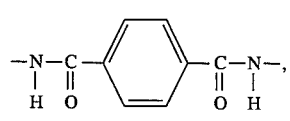

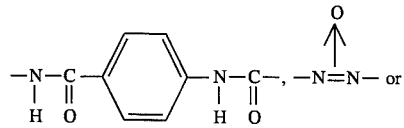, —N=N— or

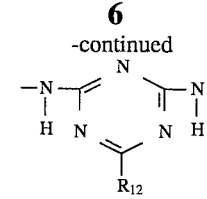

wherein $R_{12}$ is chloro, hydroxy, —$NH_2$ or

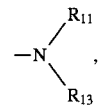

in which $R_{11}$ is hydrogen or $C_1$–$C_4$alkyl, and $R_{13}$ is hydrogen, unsubstituted or substituted $C_1$–$C_4$alkyl or phenyl.

In the dyes of formulae (2) or (3) $X_1$ is preferably a direct bond or a linking group of formula

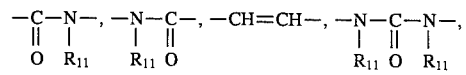

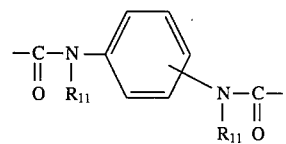

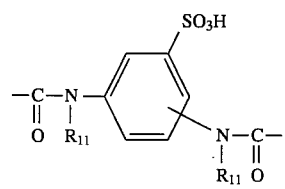

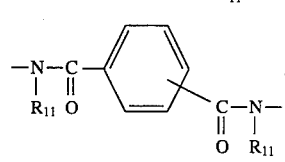, —N=N— or

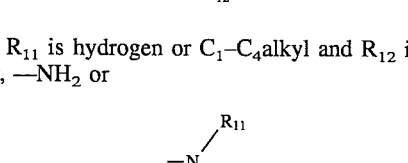

wherein $R_{11}$ is hydrogen or $C_1$–$C_4$alkyl and $R_{12}$ is chloro, hydroxy, —$NH_2$ or

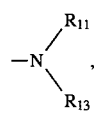

wherein $R_{11}$ is defined above, and $R_{13}$ is hydrogen, unsubstituted or substituted $C_1$–$C_4$alkyl or unsubstituted or substituted phenyl.

Among these dyes, those of formuale (2) or (3) are especially preferred in which $X_1$ is a direct bond or a linking group of formula

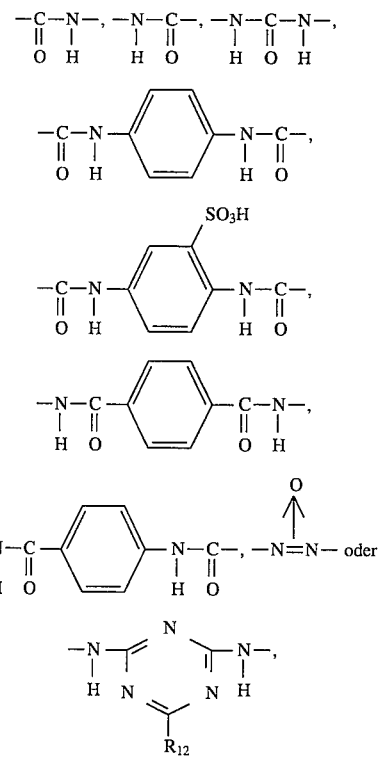

wherein $R_{12}$ is chloro, hydroxy, —$NH_2$ or

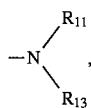

in which $R_{11}$ is hydrogen or $C_1$–$C_4$alkyl, and $R_{13}$ is hydrogen or $C_1$–$C_4$alkyl.

The dyes of formulae (1), (2) and (3) preferably contain at least two sulfo groups which may be in the form of the free acid (—$SO_3H$) or in salt form (—$SO_3M$). These sulfo groups are preferably in the positions of the substituents $R_2$ to $R_5$ and $R_7$ to $R_{10}$. Two to four, preferably two, sulfo groups are preferred. M is preferably an equivalent of a colourless cation, typically lithium, sodium, potassium, ammonium or the protonated form of a $C_4$–$C_{12}$trialkylamine, $C_4$–$C_{12}$diamine, $C_2$–$C_{12}$alkanolamine or of a polyglycol amine, conveniently triethanolamine trisglycol ether.

M as a protonated $C_4$–$C_{12}$trialkylamine may conveniently be a protonated N-ethyldimethylamine, N,N-diethylmethylamine, tri-n-propylamine, tri-n-butylamine, tri-isobutylamine and, preferably, triethylamine or triisopropylamine. Mixtures of protonated amines are also suitable.

M as a protonated $C_4$–$C_{12}$diamine may typically be ethylenediamine or 1,3-diaminopropane, in which one or both N-atoms are additionally substituted by one or two $C_1$–$C_4$alkyl radicals, preferably methyl or ethyl radicals. M is preferably a N,N-dialkylethylenediamine or N,N-dialkyl-1,3-diaminopropane.

Illustrative examples are: N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

M as a protonated $C_2$–$C_{12}$alkanolamine may be the protonated form of a monoalkanolamine, dialkanolamine, monoalkanolmonoalkylamine, monoalkanoldialkylamine, dialkanolalkylamine, or trialkanolamine or a mixture of different protonated alkanolamines. Illustrative examples are: protonated 2-aminoethanol, bis(2-hydroxyethyl)amine, N-(2-hydroxyethyl)dimethylamine, N-(2-hydroxyethyl)diethylamine, N,N-bis(2-hydroxyethyl)methylamine, N,N-bis(2-hydroxyethyl)ethylamine or tris(2-hydroxyethyl)amine, 2-aminoethoxyethanol or diethylaminopropylamine.

The preferred meaning of M is $Na^\oplus$, $Li^\oplus$ or protonated $C_4$–$C_6$alkanolamine, and the preferred $C_4$–$C_6$alkanolamines are tris(2-hydroxyethyl)amine, bis(2-hydroxyethyl)amine or a mixture of these two amines.

The dyes of formulae (1), (2) or (3) are prepared in a manner known per se, typically by tetraazotising a diamine of formula

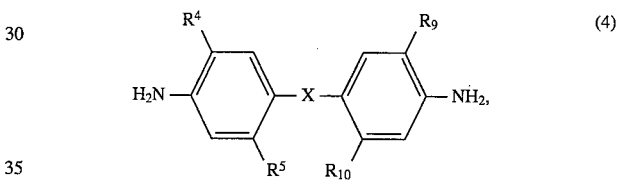

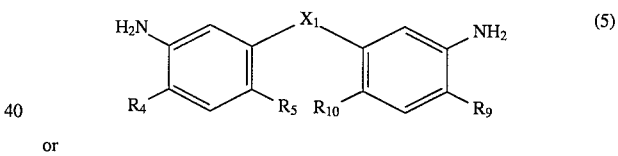

or

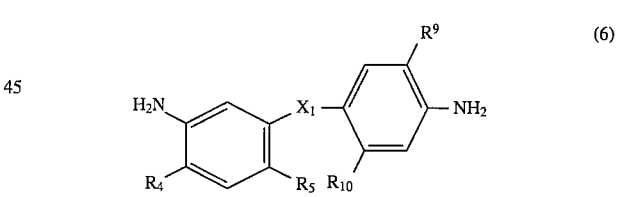

and coupling the tetrazotised product with one or more than one coupling component of formula

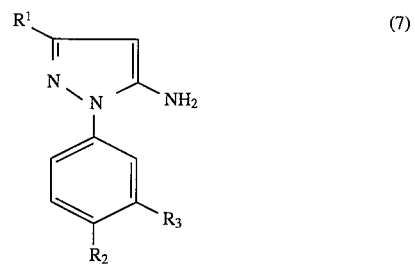

wherein $R_1$, $R_2$, $R_3$, $R_4$, $R_5$, X and $X_1$ are defined for formulae (1), (2) and (3). It is preferred to use only one coupling component. Tetrazotisation and coupling are carried out in conventional manner.

If X or X₁ is a linking group of formula

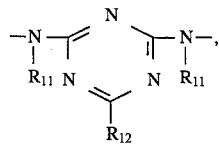

it is also possible to react a compound of formula

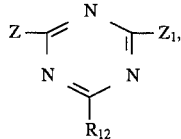

wherein Z and Z₁ are each halogen, with an amine of formula

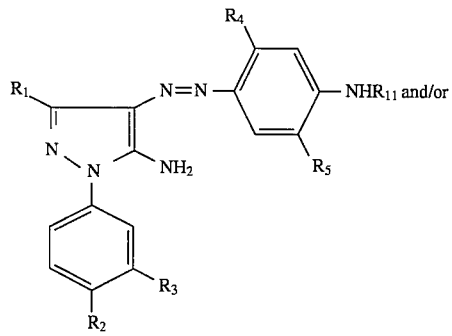

(8)

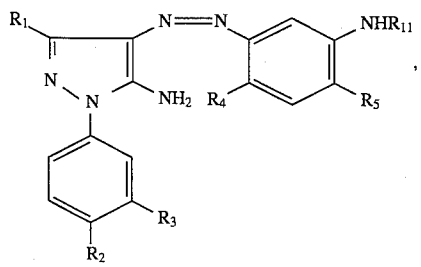

(9)

wherein $R_1$, $R_2$, $R_3$, $R_4$, $R_5$, $R_{11}$ and $R_{12}$ are as defined for formulae (1), (2) and (3). The reaction is carried out in conventional per se known manner.

Especially preferred dyes correspond to the formula

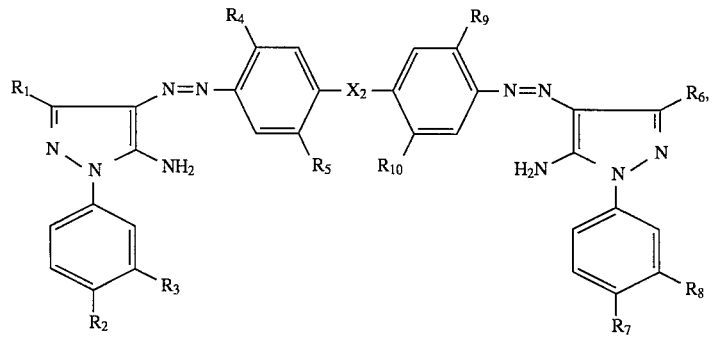

wherein $R_1$ and $R_6$ are each independently of the other hydrogen or alkyl, $R_4$, $R_5$, $R_9$ and $R_{10}$ are each independently of one another hydrogen, $C_1$–$C_4$alkyl, $C_1$–alkoxy or sulfo, $R_2$, $R_3$, $R_7$ and $R_8$ are each independently of one another hydrogen, chloro, methyl or sulfo, $X_2$ is a linking group of the formula

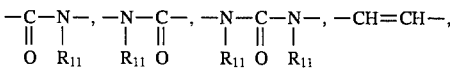

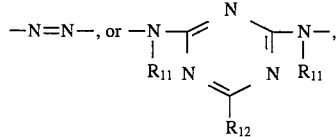

wherein $R_{11}$ is hydrogen or unsubstituted or substituted $C_1$–$C_6$alkyl, and $R_{12}$ is chloro, hydroxy, —NH₂ or

wherein $R_{11}$ is as defined above, and $R_{13}$ is hydrogen, unsubstituted or substituted $C_1$–$C_6$alkyl or unsubstituted or substituted phenyl, or wherein $R_{11}$ and $R_{13}$, together with the linking nitrogen atom, form a 5- or 6-membered ring, with the proviso that the dyes of the formula (10) contain at least three sulfo groups if $X_2$ is a linking group of formula

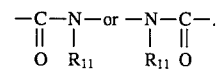

The dyes of formulae (1), (2) and (3) are especially suitable for dyeing paper, as they have a high substantivity for this substrate. The yellow, greenish-yellow, or red dyeings obtained have good fastness properties.

The dyes of formulae (1), (2) and (3) can be formulated to solid or liquid physical forms and used for dyeing paper.

In powder or granular form the dyes are used preferably for batchwise mass dyeing in which the dye is added batchwise to the pulper, hollander or mixing chest. The dyes are preferably added as formulations which may contain extenders, e.g. urea as solubiliser, dextrins, Glauber's salt, sodium chloride, as well as dispersants, dust inhibitors and chelating agents such as tetrasodium pyrophosphate.

(10)

The invention accordingly also relates to solid dye formulations for dyeing paper, which formulations contain dyes of formulae (1), (2) or (3).

In recent years the use of concentrated aqueous solutions of dyes has gained importance on account of the advantages which such solutions have over dyes in powder form. The use of solutions avoids the problems associated with dust formation, and the dyer is relieved of the time-consuming and often difficult operation of dissolving the dye powder in water. The use of dye solutions has, moreover, been promoted by the development of continuous processes for dyeing paper, as in such processes it is expedient to add the solution direct to the hollander or at any other suitable juncture in paper manufacture.

Hence the invention further relates to concentrated aqueous solutions of dyes of formula (1), (2) or (3), which solutions contain not less than 5% by weight, typically 8 to 30% by weight of dye, based on the total weight of the solution.

Concentrated aqueous solutions of dyes of formula (1), (2) or (3) can be prepared e.g. by filtering the dye suspension obtained in the synthesis of the dye, if appropriate effecting deionisation, conveniently by a membrane separation method, and stabilising the solution by the addition of auxiliaries such as urea, ε-caprolactam or polyethylene glycol. It is, however, also possible to suspend the isolated dye in hydrochloric acid, to filter the dye suspension once more and to mix the filter cake with lithium hydroxide or a suitable amine, typically an alkanolamine, and the requisite amount of water. Finally, it is also possible to carry out the coupling in the presence of LiOH, ammonia or alkanolamine, and to deionise the synthesis solution. Such dye solutions are suitable for dyeing paper pulp in the presence of rosin and alum size.

The dye solutions so obtained preferably contain, per 100 parts of dye in the form of the free acid, 400 to 900 parts of water, 0 to 200 parts of further auxiliaries such as urea, ε-caprolactam or polyethylene glycol, as well as sufficient base for the pH to be in the range from 7 to 10. Suitable bases are typically NaOH, LiOH, ammonia or organic amines, conveniently alkanolamines.

The novel aqueous concentrates, which are stable at storage temperatures of down to −5° C., are suitable for dyeing paper on which, with or without the use of a size, they give attractive yellow to red shades.

The dyes of formulae (1), (2) and (3) can also be used for dyeing textile materials made of cellulose, e.g. cotton, as well as for dyeing leather and glass fibres.

In the following illustrative Examples parts and percentages are by weight.

EXAMPLE 1

46 parts of 4-aminoacetanilide-3-sulfonic acid are suspended in 200 parts of water and 48 parts of 32% hydrochloric acid, and diazotisation is carried out with 13.8 parts of sodium nitrite at 0°–5° C. Shortly before coupling, the pH is adjusted to 6.5 with 30% aqueous sodium hydroxide.

34.6 parts 3-methyl-1-phenyl-5-aminopyrazole are suspended in 200 parts of water and the pH is adjusted to 8.5 with aqueous sodium hydroxide. The suspension so obtained is added over 10 minutes to the above suspension of the diazo component. Coupling is then carried out at by addition of c. 27 parts of 30% aqueous sodium hydroxide at pH 8.5 initially for 2 hours at room temperature and thereafter for 2 hours at 40° C.

To remove the protective group, 130 parts of 30% aqueous sodium hydroxide are added and the coupling mixture is stirred for 2 hours at 90° C. The dye solution is then cooled to 20° C., adjusted to pH 4 by addition of 116 parts of 32% hydrochloric acid, and the dye is salted out with 90 parts of sodium chloride and isolated by filtration.

79.8 parts of the dye so obtained are dissolved in 800 parts of water and 4 parts of 30% aqueous sodium hydroxide at pH 7 and condensed with 15 parts of cyanuric chloride for 3 hours at 0°–2° C., while keeping the pH at 7 with 10 parts of 30% aqueous sodium hydroxide. The reaction mixture is then warmed to 40° C. over 1 hour and the condensation is brought to completion by addition of 16 parts of 30% aqueous sodium hydroxide over 8 hours at pH 8.5.

Afterwards 9.8 parts of ethanolamine are added and the reaction mixture is stirred for 4 hours at 95° C. The dye is salted out with 50 parts of sodium chloride and isolated by filtration at room temperature, giving 75 parts of the dye of formula

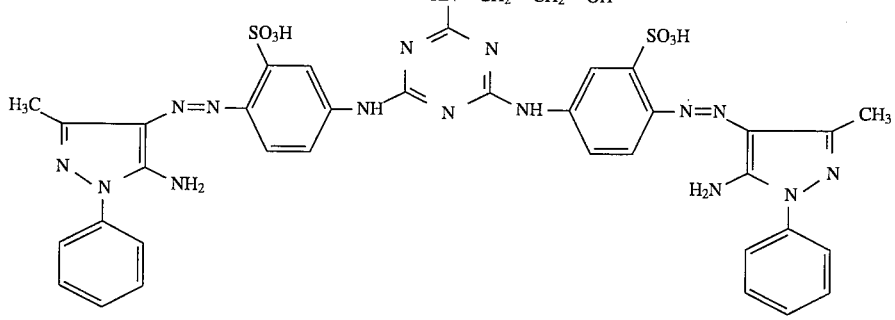

which dyes paper in a yellow shade of good fastness properties and has excellent substantivity.

EXAMPLE 2

30.7 parts of 4,4'-diaminobenzanilide-3-sulfonic acid are suspended in 300 parts of water and 48 parts of 32% hydrochloric acid and tetrazotised by addition of 13.8 parts of sodium nitrite at 0°–5° C. Shortly before coupling, the pH is adjusted with c. 5 parts of sodium acetate to 2.5.

52 parts of 3-methyl-1-(3-sulfophenyl)-5-aminopyrazole are dissolved in 200 parts of water with aqueous sodium hydroxide at pH 6. This solution is added at 0°–5° C. over 30 minutes to the above suspension of the tetrazo component, while keeping the pH at 4–5 by addition of 30% aqueous sodium hydroxide. After warming to room temperature, the coupling is brought to completion at pH 6–7. The dye is salted out with 100 parts of sodium chloride, isolated by filtration and dried, giving 80 parts of the dye of formula

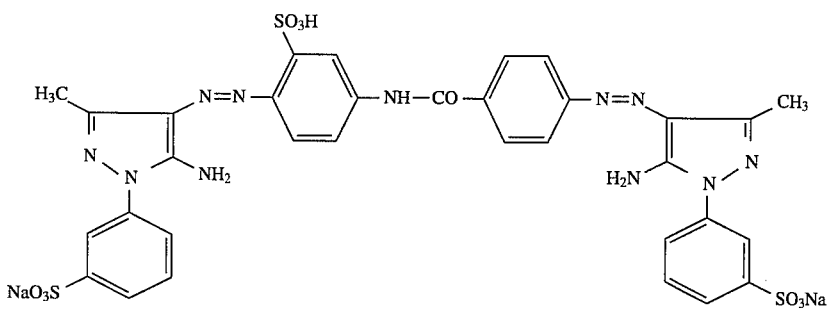

which dyes paper in a yellow shade and has excellent substantivity.

EXAMPLE 3

The process described in Example 2 is repeated, but using an equivalent amount of 4,4'-diaminobenzanilide-3,6-disulfonic acid instead of 4,4'-diaminobenzanilide- 3-sulfonic acid, the remaining conditions being the same, to give a dye which also dyes paper in a yellow shade of good fastness properties.

EXAMPLES 4–10

In accordance with the general procedure described in Example 1, the following dyes which dye paper in yellow shades of good fastness properties are obtained:

| Ex. | $R_2, R_7$ | $R_3, R_8$ | $R_4, R_9$ | $R_5, R_{10}$ | $R_{12}$ |
|---|---|---|---|---|---|
| 4 | H | H | $SO_3H$ | H | $-N(CH_2-CH_2-OH)_2$ |
| 5 | H | H | $SO_3H$ | H | morpholino |
| 6 | H | H | $SO_3H$ | H | $-NH-C_6H_5$ |
| 7 | H | H | H | $SO_3H$ | $-N(CH_2-CH_2-OH)_2$ |
| 8 | $SO_3H$ | H | H | H | $-NH-C_6H_4-SO_3H$ |

-continued

[Structure: bis-pyrazolylazo compound with central triazine bearing R12, linked via two NH groups to two phenyl-azo-pyrazole units with substituents R2–R5 and R7–R10]

| Ex. | R$_2$, R$_7$ | R$_3$, R$_8$ | R$_4$, R$_9$ | R$_5$, R$_{10}$ | R$_{12}$ |
|---|---|---|---|---|---|
| 9 | H | SO$_3$H | H | H | $-\text{N}(\text{C}_2\text{H}_5)(\text{C}_6\text{H}_5)$ |
| 10 | Cl | H | SO$_3$H | H | $-\text{N}(\text{CH}_2\text{CH}_2\text{OH})_2$ |

EXAMPLES 11–15

In accordance with the general procedure described in Example 2, the following dyes which dye paper in yellow shades of good fastness properties are obtained:

[Structure: bis-pyrazolylazo compound with central –NH–CO–NH– urea linkage between two phenyl-azo-pyrazole units bearing R2–R5 and R7–R10]

| Ex. | R$_2$, R$_7$ | R$_3$, R$_8$ | R$_4$, R$_9$ | R$_5$, R$_{10}$ |
|---|---|---|---|---|
| 11 | H | H | SO$_3$H | H |
| 12 | H | H | H | SO$_3$H |
| 13 | SO$_3$H | H | H | H |
| 14 | H | SO$_3$H | H | H |
| 15 | H | Cl | SO$_3$H | H |

EXAMPLES 16–22

In accordance with the general procedure described in Example 2, the following dyes which dye paper in greenish yellow shades of good fastness properties are obtained:

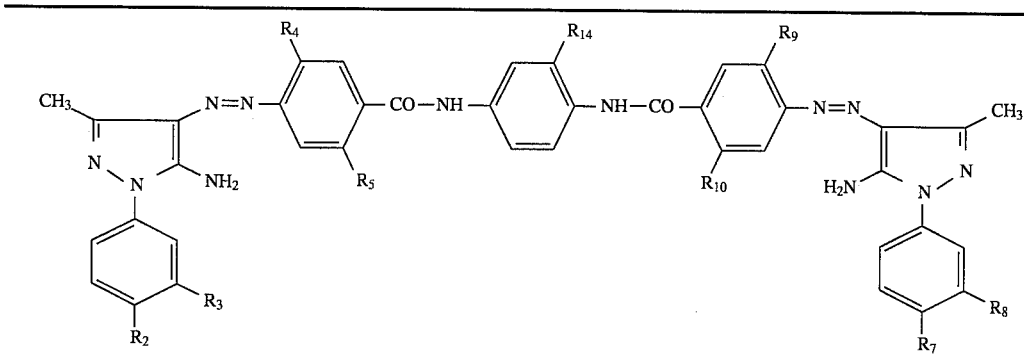

| Ex. | $R_2, R_7$ | $R_3, R_8$ | $R_4, R_9$ | $R_5, R_{10}$ | $R_{14}$ |
|---|---|---|---|---|---|
| 16 | H | H | $SO_3H$ | H | H |
| 17 | H | H | H | $SO_3H$ | H |
| 18 | $SO_3H$ | H | H | H | H |
| 19 | H | $SO_3H$ | H | H | H |
| 20 | H | $SO_3H$ | H | H | $SO_3H$ |
| 21 | Cl | H | $SO_3H$ | H | $SO_3H$ |
| 22 | H | $SO_3H$ | $SO_3H$ | H | H |

EXAMPLES 23–28

In accordance with the general procedure described in Example 2, the following dyes which dye paper in yellow shades of good fastness properties are obtained:

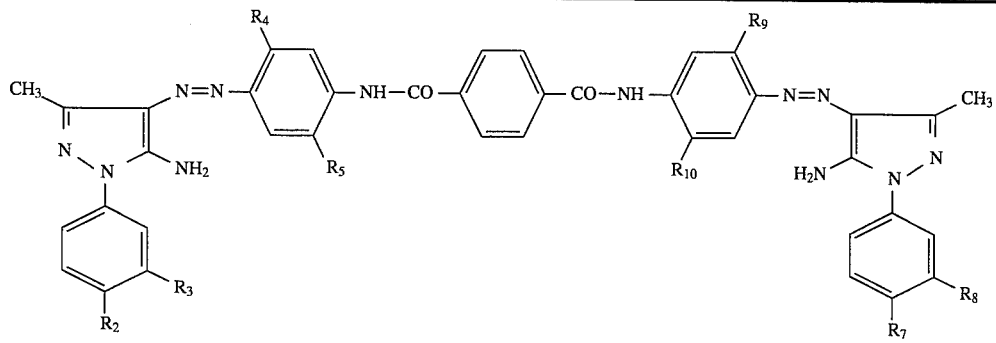

| Ex. | $R_2, R_7$ | $R_3, R_8$ | $R_4, R_9$ | $R_5, R_{10}$ |
|---|---|---|---|---|
| 23 | H | H | $SO_3H$ | H |
| 24 | H | H | H | $SO_3H$ |
| 25 | $SO_3H$ | H | H | H |
| 26 | H | $SO_3H$ | H | H |
| 27 | Cl | H | $SO_3H$ | H |
| 28 | H | $SO_3H$ | $SO_3H$ | H |

EXAMPLES 29–31

In accordance with the general procedure described in Example 2, the following dyes which dye paper in yellow shades (Examples 29 and 30) and red shades (Example 31) of good fastness properties are obtained:

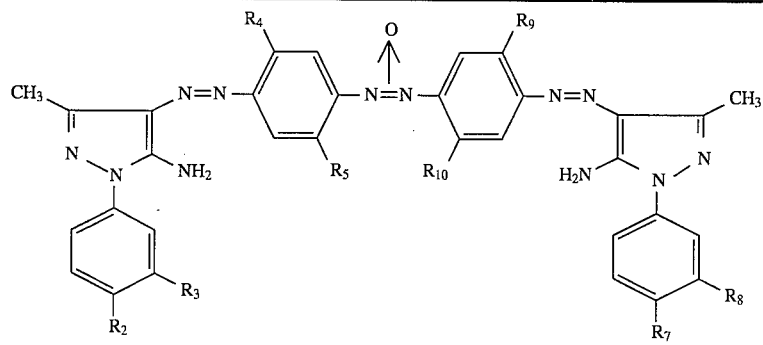

| Ex. | $R_2, R_7$ | $R_3, R_8$ | $R_4, R_9$ | $R_5, R_{10}$ |
|---|---|---|---|---|
| 29 | $SO_3H$ | H | H | H |
| 30 | H | $SO_3H$ | H | H |
| 31 | H | $SO_3H$ | $OCH_3$ | H |

EXAMPLES 32–34

In accordance with the general procedure described in Example 2, the following dyes which dye paper in yellow shades of good fastness properties are obtained:

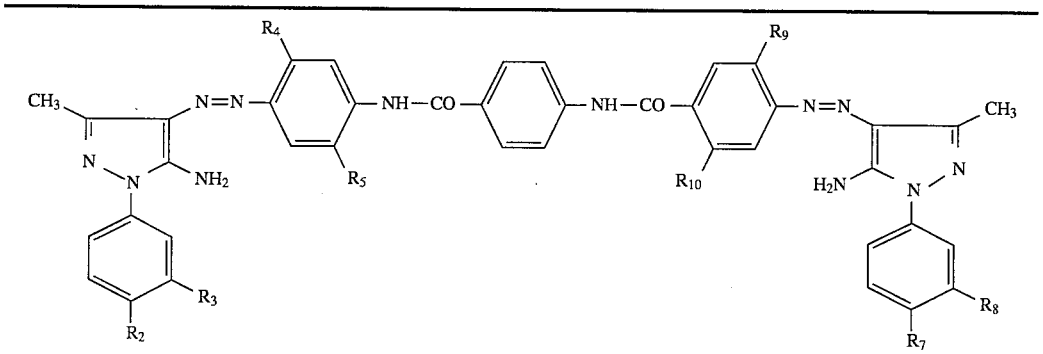

| Ex. | $R_2, R_7$ | $R_3, R_8$ | $R_4, R_9$ | $R_5, R_{10}$ |
|---|---|---|---|---|
| 32 | H | H | $SO_3H$ | H |
| 33 | H | $SO_3H$ | H | H |
| 34 | $SO_3H$ | H | H | H |

EXAMPLES 35–47

In accordance with the general procedure described in Example 2, the following dyes which dye paper in greenish-yellow shades of good fastness properties are obtained:

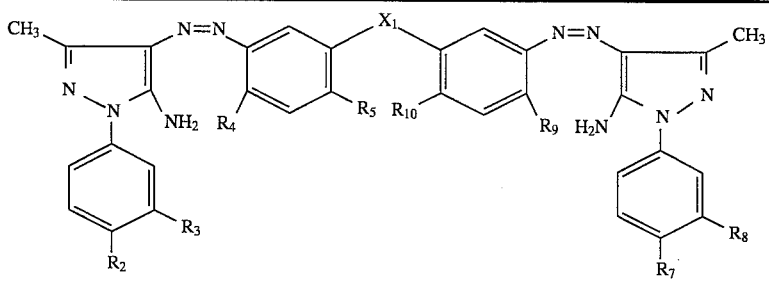

| Ex. | $R_2, R_7$ | $R_3, R_8$ | $R_4, R_9$ | $R_5, R_{10}$ | $X_1$ |
|---|---|---|---|---|---|
| 35 | H | H | $SO_3H$ | H | —NH—CO— |
| 36 | H | $SO_3H$ | H | H | —NH—CO— |
| 37 | $SO_3H$ | H | H | H | —NH—CO— |
| 38 | H | H | $SO_3H$ | H | triazine with $N(CH_2CH_2OH)_2$, —NH—, —NH— |
| 39 | H | $SO_3H$ | H | H | triazine with $N(CH_2CH_2OH)_2$, —NH—, —NH— |
| 40 | $SO_3H$ | H | H | H | triazine with $N(CH_2CH_2OH)_2$, —NH—, —NH— |
| 41 | Cl | H | $SO_3H$ | H | triazine with $N(CH_2CH_2OH)_2$, —NH—, —NH— |
| 42 | H | H | $SO_3H$ | H | —OC—NH—C$_6$H$_4$—NH—CO— |
| 43 | H | $SO_3H$ | H | H | —OC—NH—C$_6$H$_4$—NH—CO— |
| 44 | $SO_3H$ | H | H | H | —OC—NH—C$_6$H$_4$—NH—CO— |
| 45 | H | H | $SO_3H$ | H | —NH—CO—C$_6$H$_4$—CO—NH— |
| 46 | H | $SO_3H$ | H | H | —NH—CO—C$_6$H$_4$—CO—NH— |
| 47 | $SO_3H$ | H | H | H | —NH—CO—C$_6$H$_4$—CO—NH— |

-continued

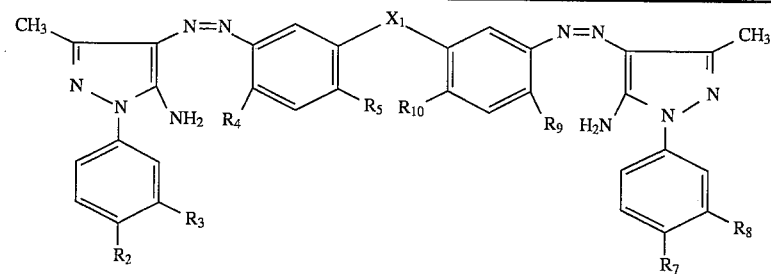

| Ex. | $R_2$, $R_7$ | $R_3$, $R_8$ | $R_4$, $R_9$ | $R_5$, $R_{10}$ | $X_1$ |
|---|---|---|---|---|---|

EXAMPLES 48–53

In accordance with the general procedure described in Example 2, the following dyes which dye paper in greenish-yellow shades of good fastness properties are obtained:

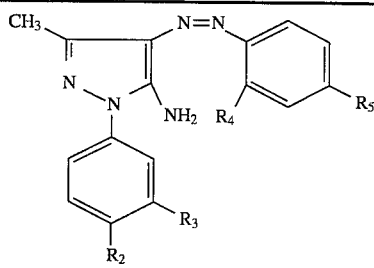

| Ex. | $R_2$, $R_7$ | $R_3$, $R_8$ | $R_4$, $R_9$ | $R_5$, $R_{10}$ | $X_1$ |
|---|---|---|---|---|---|
| 48 | $SO_3H$ | H | H | H | —NH—CO— |
| 49 | H | H | $SO_3H$ | H | —NH—CO— |
| 50 | H | H | $SO_3H$ | H | triazine with $N(CH_2CH_2OH)_2$ |
| 51 | H | H | H | $SO_3H$ | triazine with $N(CH_2CH_2OH)_2$ |
| 52 | $SO_3H$ | H | H | H | triazine with $N(CH_2CH_2OH)_2$ |
| 53 | H | $SO_3H$ | H | H | triazine with $N(CH_2CH_2OH)_2$ |

EXAMPLE 54

The procedure described in Example 2 is repeated, but replacing 4,4'-diaminobenzanilide-3-sulfonic acid with an equivalent amount of 4,4'-diaminobenzanilide-3,6-disulfonic acid and replacing 3-methyl-1-(3-sulfophenyl)-5-aminopyrazole with an equivalent amount of 3-methyl-1-phenyl- 5-aminopyrazole, the remaining conditions being the same, to give the dye of formula

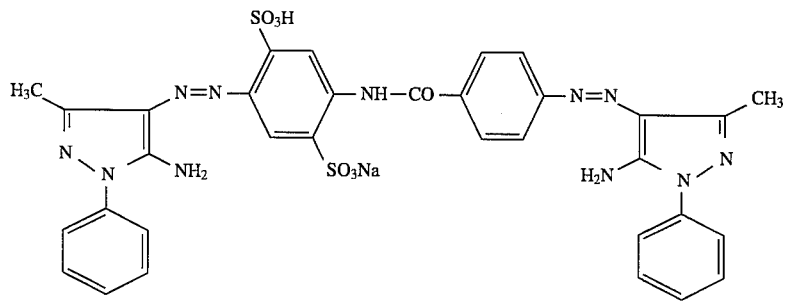

which also dyes paper in yellow shades of good fastness properties.

EXAMPLE 55

0.5 part of the dye powder of Example 1 is dissolved in 100 parts of hot water and the solution is cooled to room temperature. This solution is added to 100 parts of chemically bleached sulfite pulp which has been beaten in 200 parts of water in a hollander. After mixing thoroughly for 15 minutes, sizing is effected in conventional manner with rosin size and aluminium sulfate. Paper manufactured from this pulp is dyed in a yellow shade of good wetfastness properties.

What is claimed is:

1. A dye of the formula

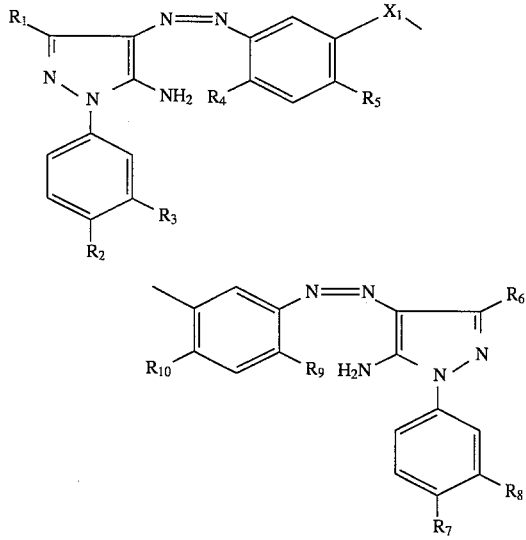

or

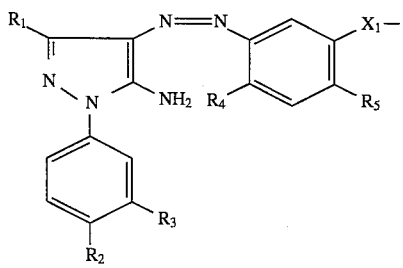

-continued

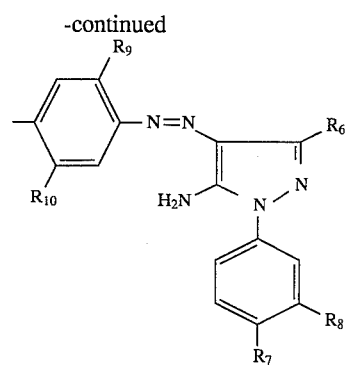

wherein $R_1$ and $R_6$ are each independently of the other hydrogen, alkyl, alkenyl, acylamino, carbamoyl, carboxy or alkoxycarbonyl, $R_2$, $R_3$, $R_7$ and $R_8$ are each independently of one another hydrogen, halogen, alkyl, sulfo or carboxy, $R_4$, $R_5$, $R_9$ and $R_{10}$ are each independently of one another hydrogen, halogen, alkyl, hydroxy, alkoxy, sulfo or carboxyalkoxy, $X_1$ is a direct bond or a linking group of the formula

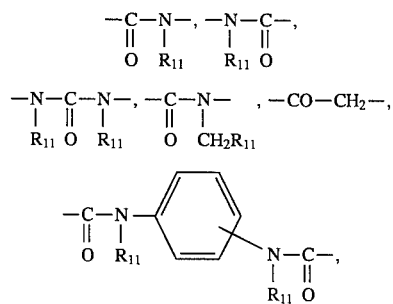

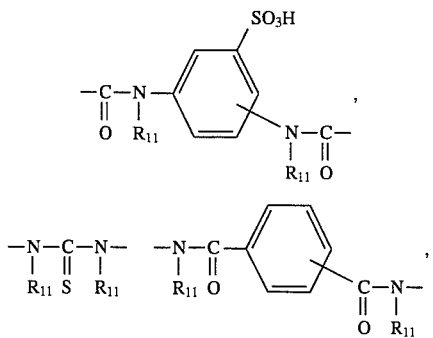

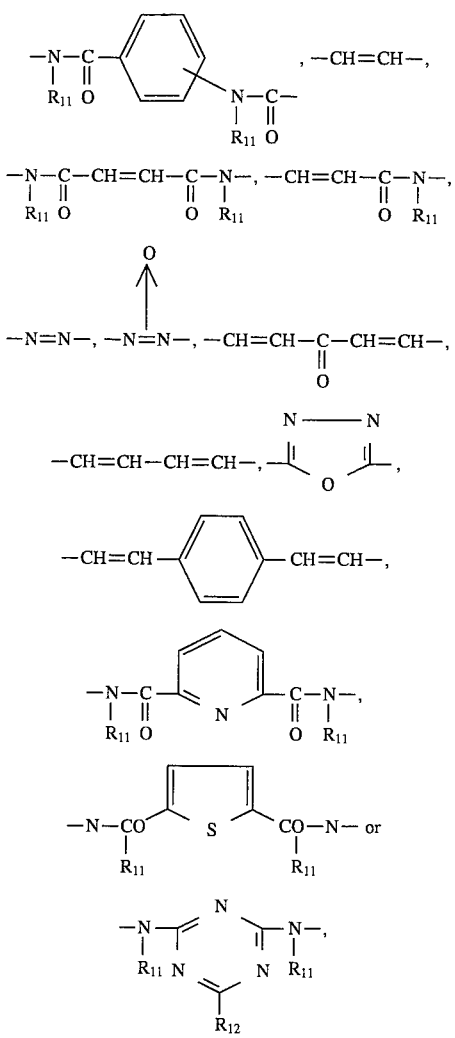

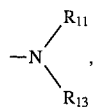

wherein $R_{11}$ is hydrogen or unsubstituted or substituted $C_1$–$C_6$alkyl, and $R_{12}$ is chloro, hydroxy, —$NH_2$ or $$-N\begin{matrix}R_{11}\\ \\R_{13}\end{matrix},$$

wherein $R_{11}$ is as defined above, and $R_{13}$ is hydrogen, unsubstituted or substituted $C_1$–$C_6$alkyl or unsubstituted or substituted phenyl, or wherein $R_{11}$ and $R_{13}$, together with the linking nitrogen atom, form a 5- or 6-membered ring.

2. A dye according to claim 1, wherein $R_1$ and $R_6$ are each independently of the other hydrogen or alkyl.

3. A dye according to claim 2, wherein $R_1$ and $R_6$ are each independently of the other $C_1$–$C_4$alkyl.

4. A dye according to claim 1, wherein $R_4$, $R_5$, $R_9$ and $R_{10}$ are each independently of one another hydrogen, $C_1$–$C_4$alkyl, $C_1$–$C_4$alkoxy or sulfo.

5. A dye according to claim 4, wherein $R_4$, $R_5$, $R_9$ and $R_{10}$ are each independently of one another hydrogen, $C_1$–$C_2$alkyl, $C_1$–$C_2$alkoxy or sulfo.

6. A dye according to claim 5, wherein $R_4$, $R_5$, $R_9$ and $R_{10}$ are each independently of one another hydrogen or sulfo.

7. A dye according to claim 1, wherein $R_2$, $R_3$, $R_7$ and $R_8$ are each independently of one another hydrogen, chloro, methyl or sulfo.

8. A dye according to claim 7, wherein $R_2$, $R_3$, $R_7$ and $R_8$ are each independently of one another hydrogen or sulfo.

9. A dye according to claim 1, wherein X is a linking group of formula

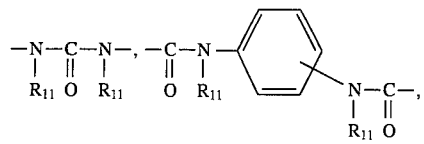

wherein $R_{11}$ is hydrogen or $C_1$–$C_4$alkyl and $R_{12}$ is chloro, hydroxy, —$NH_2$ or $$-N\begin{matrix}R_{11}\\ \\R_{13}\end{matrix},$$

in which $R_{11}$ is as defined above, and $R_{13}$ is hydrogen, unsubstituted or substituted $C_1$–$C_4$alkyl or unsubstituted or substituted phenyl.

10. A dye according to claim 9, wherein X is a linking group of formula

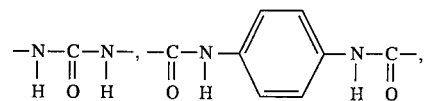

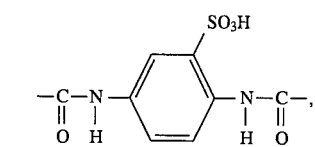

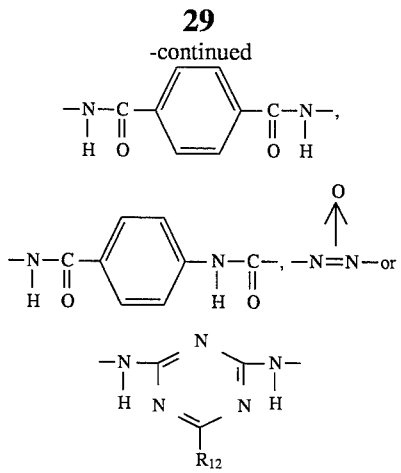

wherein $R_{12}$ is chloro, hydroxy, —$NH_2$ or

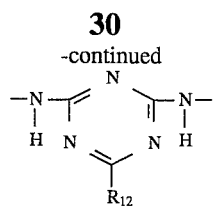

in which $R_{11}$ is hydrogen or $C_1$–$C_4$alkyl, and $R_{13}$ is hydrogen, unsubstituted or substituted $C_1$–$C_4$alkyl or phenyl.

11. A dye according to claim 1, wherein $X_1$ is a direct bond or a linking group of formula

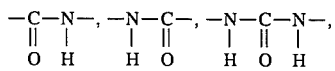

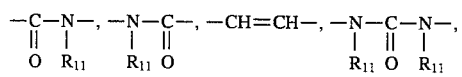

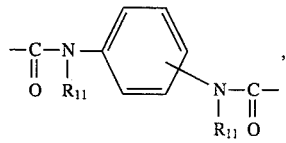

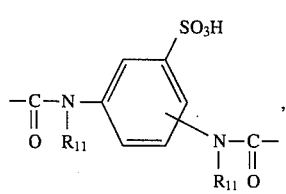

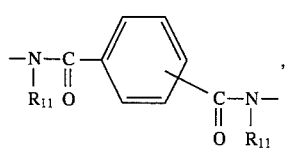

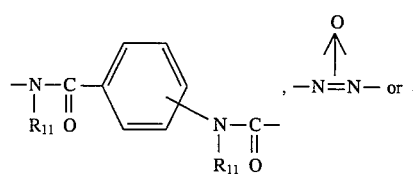

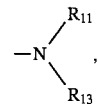

wherein $R_{11}$ is hydrogen or $C_1$–$C_4$alkyl and $R_{12}$ is chloro, hydroxy, —$NH_2$ or

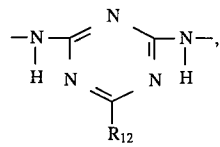

wherein $R_{11}$ is as defined above, and $R_{13}$ is hydrogen, unsubstituted or substituted $C_1$–$C_4$alkyl or unsubstituted or substituted phenyl.

12. A dye according to claim 11, wherein $X_1$ is a direct bond or a linking group of formula

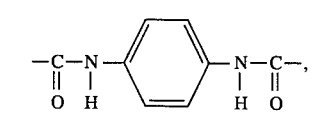

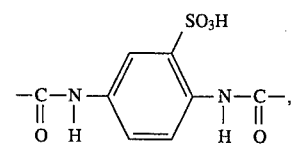

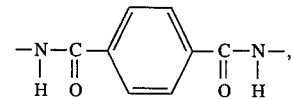

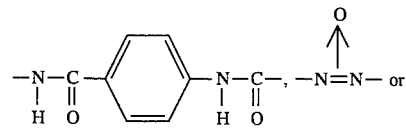

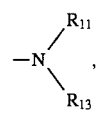

wherein $R_{12}$ is chloro, hydroxy, —$NH_2$ or in which $R_{11}$ is hydrogen or $C_1$–$C_4$alkyl, and $R_{13}$ is hydrogen or $C_1$–$C_4$alkyl.

13. A dye according to claim 1, which contains at least 2 sulfo groups.

14. A dye according to claim 13, which contains 2 to 4, preferably 2, sulfo groups.

15. A dye containing at least two sulfo groups and having the formula

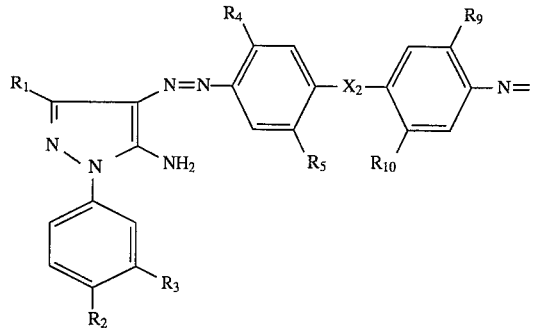
(10)

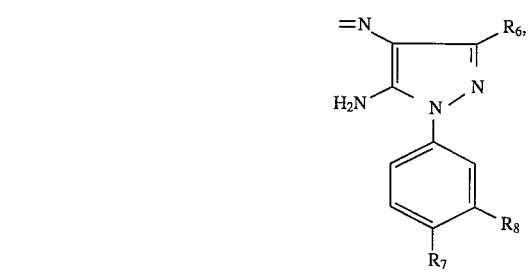

wherein $R_1$ and $R_6$ are each independently of the other hydrogen or alkyl, $R_4$, $R_5$, $R_9$ and $R_{10}$ are each independently of one another hydrogen, $C_1$–$C_4$alkyl, $C_1$–$C_4$alkoxy or sulfo, $R_2$, $R_3$, $R_7$ and $R_8$ are each independently of one another hydrogen, chloro, methyl or sulfo, $X_2$ is a linking group of the formula

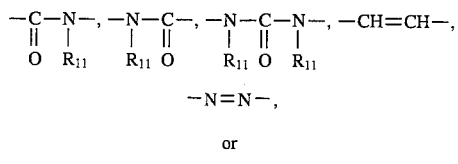

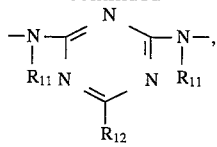

wherein $R_{11}$ is hydrogen or unsubstituted or substituted $C_1$–$C_6$alkyl, and $R_{12}$ is chloro, hydroxy, —$NH_2$ or

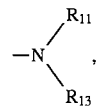

wherein $R_{11}$ is as defined above, and $R_{13}$ is hydrogen, unsubstituted or substituted $C_1$–$C_6$alkyl or unsubstituted or substituted phenyl, or wherein $R_{11}$ and $R_{13}$, together with the linking nitrogen atom, form a 5- or 6-membered ring, with the proviso that the dye of the formula (10) contains at least three sulfo groups if $X_2$ is a linking group of formula

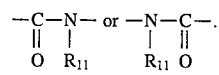

16. A solid dye formulation for dyeing paper which contains a dye of formula (2) or (3) as claimed in claim 1 and a solid adjuvant.

17. A concentrated aqueous solution of a dye of formula (2) or (3), which contains 8 to 30% by weight of dye, based on the total weight of the solution.

18. A concentrated solution according to claim 17, wherein the dye is in the form of a lithium or alkanolamine salt.

19. A concentrated aqueous solution according to claim 18, wherein the dye is in the form of a diethanolamine, triethanolamine or polyglycolamine salt.

20. A process for dyeing paper, which comprises bringing an aqueous paper pulp into contact with a dye of the formula (2) or (3) as claimed in claim 1.

21. A process for dyeing paper, which comprises bringing an aqueous paper pulp into contact with a dye of the formula (2) or (3) as claimed in claim 1, in the form of a solid dye formulation or of a concentrated aqueous solution.

22. Paper dyed with a dye as claimed in claim 1.

* * * * *